June 7, 1955

C. C. LAZZARI 2,710,025

PULSATION DAMPENERS

Filed March 13, 1953

Craig C. Lazzari
INVENTOR.

BY J. Vincent Martin
Joe E. Edwards
B. R. Pravel
ATTORNEYS

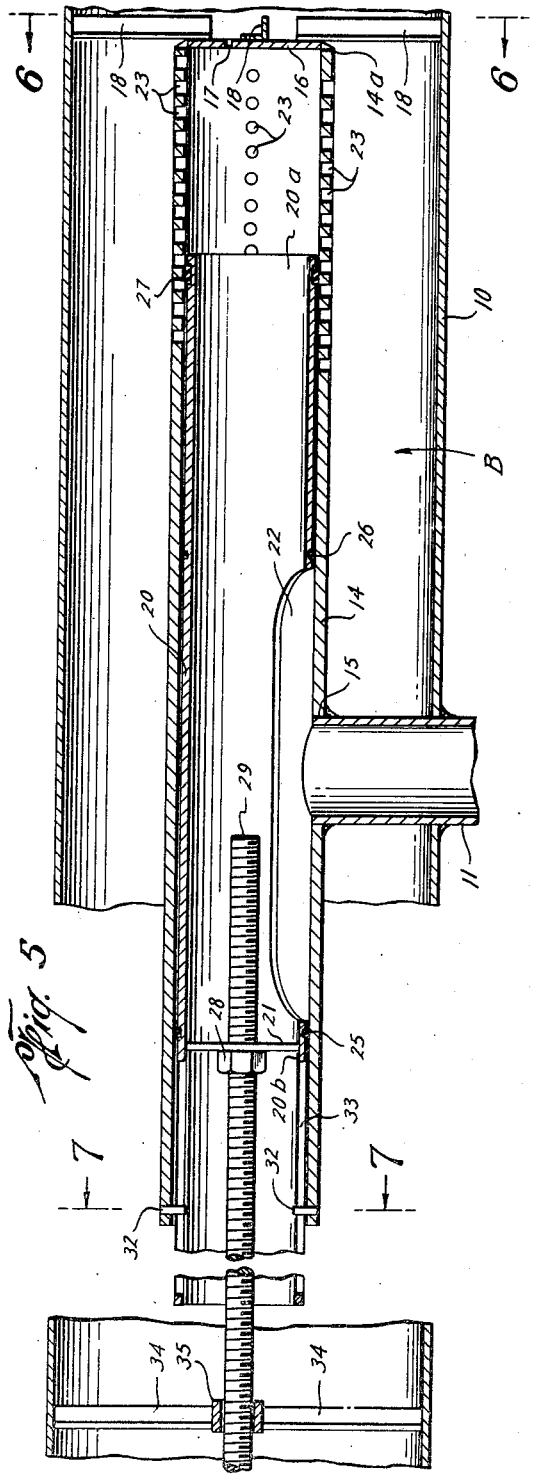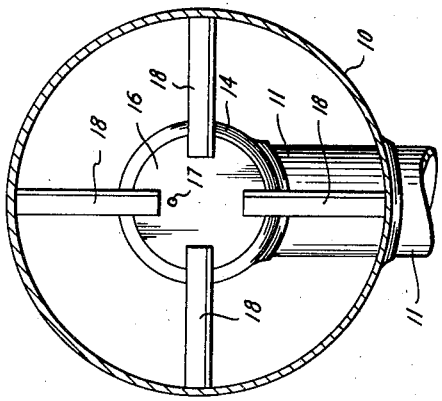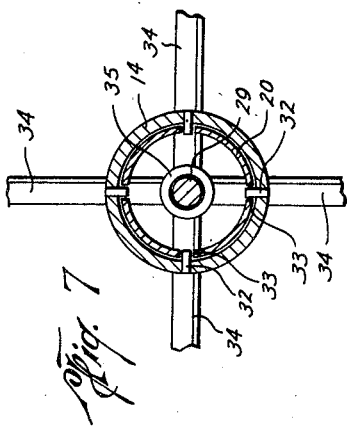

United States Patent Office 2,710,025
Patented June 7, 1955

2,710,025

PULSATION DAMPENERS

Craig C. Lazzari, Houston, Tex.

Application March 13, 1953, Serial No. 342,074

9 Claims. (Cl. 138—26)

This invention relates to new and useful improvements in pulsation dampeners.

In the compression of gases for transmission through a gas transmission pipe line as well as in the compression of gases for transmission through other lines and for other purposes, it has been found that the flow of gas in the line is often rough, that is, the gas flows in pulsations or surges which results in vibration in the line and the consequent noise and damage to the line and the equipment connected therewith. The pulsations or surges which cause such rough flow of the gas through the line are caused by a number of factors or conditions among which are: quantity of gas flow, pressure, temperature and specific gravity of the gas flowing, the velocity of sound in the gas, the speed of the gas compressor, the number of the compressor cylinders and the compressor engine crank angle. A change in any one of the foregoing factors affects the flow of the gases and requires a change in any device which is used to compensate or remove the rough flow which has resulted from the change in the various factors or conditions.

Prior devices have reduced pulsations or surges in the gas by a drop in the pressure of the gas flowing in the pipe line. These prior devices have usually been individually constructed for a given set of flowing conditions or factors and when the conditions vary, such prior units are rendered ineffective. Also the prior dampener units for reducing pulsations or surges in flowing gases have not provided for the control of the volume of the dampener through which the gas flows so that such prior dampeners have been unable to control the acoustical conditions in the system whereby resonance has often resulted as the gas flows through the dampener.

It is an object of this invention to provide an improved pulsation dampener wherein a pressure drop in the gas flowing through the dampener is effected to reduce pulsations in the gas, the pressure drop being controlled to compensate for varying conditions which cause the pulsations in the flowing gas.

It is an important object of this invention to provide an improved pulsation dampener for use with a line carrying gases under compression, wherein the dampener can control the pressure drop in the gas flowing therethrough and also can control the volume of the dampener through which the gas flows so as to alter the acoustical conditions of the dampener, whereby the flow of gas is rendered smooth or free from pulsations or surges.

Another object of this invention is to provide an improved pulsation dampener which is adapted to be connected in a line carrying gas under compression, wherein pulsations or surges in the gas flowing in the line are removed or smoothed out by providing a pressure drop in the gas flowing, with means being provided for controlling the extent of the pressure drop to thereby compensate for changes in conditions which affect the smooth flow of the gas, thereby enabling the dampener to reduce pulsations or surges of the gas even under varying conditions of gas flow.

A further object of this invention is to provide an improved pulsation dampener for reducing surges or pulsations in gas flowing in a line, wherein the dampener includes in combination a means for providing a variable pressure drop in the flowing gas and a means for regulating the volume of the dampener through which the gas flows, so that the variable pressure drop means reduces the pulsations from causes other than the resonant properties of the flowing gas and the volume control means reduces the pulsations caused by the resonant properties of the flowing gas, whereby the flow characteristics of gas are controlled to obtain substantially smooth flow thereof through the line.

The construction designed to carry out the invention will be hereinafter described together with other features thereof.

The invention will be more readily understood from a reading of the following specifications and by reference to the accompanying drawings forming a part thereof, wherein an example of the invention is shown, and wherein:

Figure 5 is a view partly in elevation and partly in section illustrating the pressure drop control means of the dampener.

Figure 6 is a sectional view taken on line 6—6 of Figure 5, and illustrates the means for preventing rotation of the inner barrel relative to the outer barrel in the pressure drop control means.

Figure 7 is a sectional view taken on line 7—7 of Figure 5, and illustrates the mounting of the outer barrel of the pressure drop control means within the dampener housing.

Figure 1:
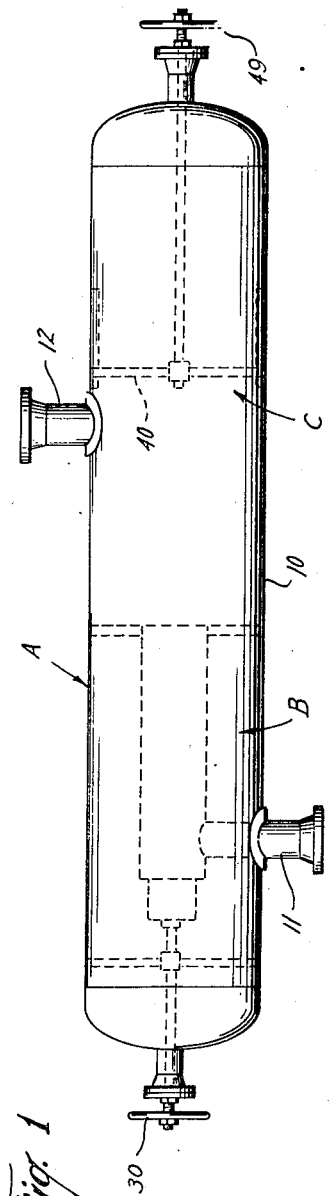
Figure 1 is an elevational view illustrating the pulsation dampener of this invention, and particularly illustrating the relationship of the pressure drop control means to the resonance control means in the dampener.

In the drawings, the letter A designates generally the pulsation dampener of this invention which includes a pressure drop control means B and a resonance control means C. The control units B and C are located within a housing or shell 10 which has an inlet opening 11 and an outlet opening 12. The inlet 11 and outlet 12 are connected to a pipe line (not shown) so that the dampener A will be interposed in the line whereby gas will flow through the line into the inlet 11 and thence through the pressure drop control means B within the housing 10 and thence outwardly through the outlet 12 to the line. While the gas is flowing through the dampener A, any pulsations or surges in the flowing gas will be reduced so that the gas leaves the dampener through the outlet 12 with a smooth flow.

In Figure 5 the details of the pressure drop control means B are shown, and such means includes an outer tube or barrel 14 disposed axially in the substantially central portion of the housing 10. The outer barrel 14 is supported at its intermediate portion by the inlet tube 11 which is welded or otherwise affixd to the housing 10 and extends through an opening 15 in the tube 14 where a weld or similar connecting means is provided between the tube 14 and the tube 11. At one end 14a of the tube 14 (the right-hand end as viewed in Figure 5), a closure plate 16 is provided to close off the end 14a of the outer tube 14. This plate is ordinarily flat as illustrated in the drawing but it can be a weld cap which is cup-shaped with the concave side facing toward the bore of the outer barrel 14. Such plate 16 may have a small orifice 17 therein the purpose of which will be explained hereinafter. The plate 16 has welded or otherwise attached thereto a plurality of transverse or radial ribs or supports 18 (Figure 6) which extend to the inner surface of the housing 10 and are welded or otherwise secured to such housing. Since the plate 16 is secured to the outer tube or barrel 14, the ribs or supports 18 provide a support for the end 14a of the tube 14 to position such tube 14 axially in a substantially central location within the housing 10. Thus, the inlet tube 11 and the support ribs 18 provide the support for the outer barrel 14 within the housing.

Figure 4:
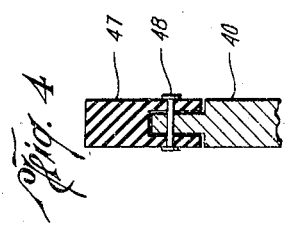
Figure 4 is a sectional view taken on line 4—4 of Figure 3 and illustrates the connection of arcuate rubber segments to the resonance plate.

Within the outer barrel 14 is an inner sleeve or barrel 20 which is longitudinally or axially slidable within such outer barrel 14. As viewed in Figure 5, the right-hand end 20a of the inner barrel 20 is open while the left-hand end 20b of the inner barrel 20 is closed by a plate 21 disposed near the end 20b. The inner barrel 20 has a longitudinal slot or opening 22 which establishes communication with the bore of the inner barrel 20 and the inlet tube 11. Thus, fluid such as gas under compression which is admitted into the inlet tube or opening 11 passes through the opening 15 in the outer barrel 14 and thence through the longitudinal slot 22 into the interior or bore of the inner barrel 20. From the interior of the barrel 20, such gas passes to the open end 20a of the inner barrel 20 for discharge through radial ports 23 near the right-hand end 14a of the outer barrel 14. The number of openings 23 which are open for the passage of the gas from the interior of the inner barrel 20 depends upon the longitudinal position of the inner barrel 20 with respect to the outer barrel 14. Thus, when the inner barrel 20 is moved to its extreme right-hand position, that is, with the end 20a abutting the closure plate 16, all of the ports 23 will be closed. As the inner barrel 20 is moved to the left and away from the closure plate 16 the ports 23 are exposed one at a time. It will be observed that the ports 23 are illustrated as being disposed in three substantially parallel groups or rows, namely, an upper group, a lower group, and a side group. There may of course be more or less of these rows or groups of openings 23, and for purposes of explanation, three rows of openings 23 are illustrated in Figure 4. In order that only one port 23 will be opened at a time during the movement of the inner barrel 20 to the left, the ports 23 in the several rows are staggered longitudinally with respect to each other. This is made clear by comparing the position of the port 23 in each row which is closest to the right-hand end 14a of the outer barrel 14. As shown in Figure 5, the port 23 which is closest to the right-hand end 14a in the top row is spaced longitudinally or axially relative to the opening or port 23 in the side row a sufficient distance so that the furthest right-hand opening 23 in the top row will be opened prior to the time that the furthest right-hand opening 23 in the side row is opened. Similarly, the furthest right-hand port or opening 23 in the lower row is spaced to the left of the furthest right-hand opening 23 in the side row so that the furthest right-hand opening 23 in the side row is opened before the furthest right-hand opening in the bottom row is opened. After the furthest right-hand opening 23 in the lower row is opened, then the next to the furthest right-hand opening 23 in the upper row will be open. This staggering of the ports or openings 23 continues in a somewhat spiral fashion so that only one opening is uncovered at a time. This permits a very fine adjustment as to the amount of pressure drop which is obtained when the gas passes through the openings 23.

Although it is preferred to expose only one opening at a time, the openings may be positioned so that more than one opening is exposed if desired. It should also be pointed out that the size of the orifices may be varied for different flow conditions. Thus, by simply changing the size of the orifices, the range of flow conditions which the dampener can handle is changed.

It will be observed that seal rings 25 and 26 are disposed in grooves in the exterior surface of the inner barrel 20 for providing a seal between the inner barrel 20 and the outer barrel 14 to prevent the escape of the gas between the barrels when such gas enters the inlet tube 11 and passes through the longitudinal slot 22. A seal ring 27 is disposed near the end of 20a of the inner barrel 20 to assure that the gas flows through only those openings 23 which are exposed to the right of the open end 20a of the inner barrel.

To control the axial or longitudinal movement of the inner barrel 20 with respect to the outer barrel 14 to thereby control the pressure drop in the gas as it passes through the ports or openings 23, there is provided on the end plate 21 of the inner barrel 20 a nut 28 which is welded or otherwise affixed to the plate 21. An operating rod 29 which is externally threaded extends through the internally threaded nut 28 and thence outwardly of the housing 10 to an operating handle or wheel 30 on the exterior of the housing 10 (Figure 1). Thus upon rotation of the handle or wheel 30 the operating rod 29 is rotated which results in a co-action between the threads on the rod 29 with the threads of the nut 28 to effect a longitudinal or axial movement of the inner barrel 20. For preventing rotation of the inner barrel 20 during the rotation of the operating rod 29, a plurality of radial guides 32 are disposed on the interior of the outer barrel 14 and extend into longitudinal slots 33 in the portion of the outer barrel 14 to the left of the plate 21. The slots 33 will of course be of substantially the same length as the longitudinal opening 22 which is of substantially the same length as the longest row of ports 23 in the outer barrel 14.

If desired, a spider having radial ribs 34 connected to the interior of the housing 10 and to a center bushing 35 may be mounted to the left of the extreme left end of the inner barrel 20 so as to provide additional support for the operating rod 29. In most cases, the spider formed by the ribs 34 and the bushing 35 could be eliminated.

Figure 2:
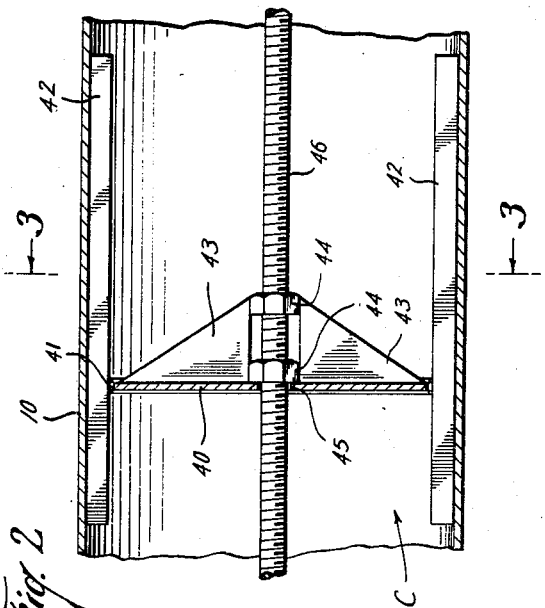
Figure 2 is a view partly in elevation and partly in section illustrating the details of the resonance plate in the dampener.
Figure 3:
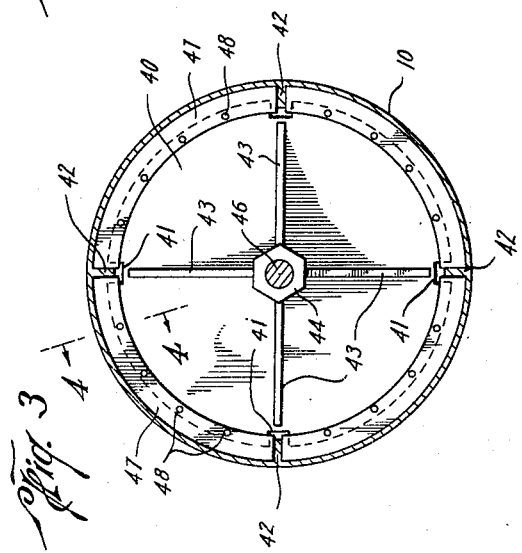
Figure 3 is an end taken on line 3—3 of Figure 2 and illustrating the detailed mounting of the resonance plate in the dampener housing.

In Figures 2 and 3, the resonance control means is illustrated in detail. Such resonance control means C includes a substantially circular resonance plate 40 which has a plurality of radial notches 41 near the periphery thereof for receiving corresponding radial guide bars 42 which are connected to the interior of the housing 10. The plate 40 has a plurality of triangular support strips 43 which are welded or otherwise affixed to one or more nuts 44 which are aligned with a central aperture 45 in the resonance plate 40. An externally threaded operating rod 46 extends through the internally threaded nuts 44 and through the central opening 45 in the plate 40 and has its other end connected to a handle or wheel 49 on the exterior of the housing 10, whereby upon rotation of the wheel 49, the operating rod 46 is rotated to effect a longitudinal movement of the resonance plate 40. The plate 40 is held against rotation by the guides 42 which extend into the notches 41 in the plate 40. Arcuate segments 47 of a resilient material such as rubber may be secured to the periphery of the plate 40 by rivets 48 for engagement with the inner surface of the housing 10 and the sides of the guides 42 to thereby prevent vibration or chatter of the plate 40 which might otherwise result during certain flow conditions. The plate 40 serves to determine the volume of the housing 10 which is available for the flowing gas to pass through. Thus, in Figure 1, the plate 40 is shown in substantially its extreme left-hand position, so that the volume of the unit which is available for the gas to flow in is that portion of the housing 10 to the left of the resonance plate 40. The plate 40 can be moved longitudinally from its extreme left position shown in Figure 1 to the right to increase the volume of the unit. By changing the volume of the unit, the resonance or acoustical properties of the flowing gas in the dampener can be altered so as to remove any pulsation or surge caused by the resonance of the gas in the unit.

In the operation or use of the dampener of this invention, the gases are admitted into the dampener through the inlet tube or opening 11 for passage therethrough into the bore or interior of the inner barrel 20. The gases pass from the interior or bore of the inner barrel 20 through its open end 20a and are discharged from the outer barrel 14 through such ports 23 as are uncovered by the inner barrel 20 which of course depends upon the relative position of the inner barrel 20 with respect to the outer barrel 14. It should be noted that the orifice 17 is provided in the closure plate 16 to prevent the possibility of completely closing off the flow of the gases, but such orifice 17 is very small and for all practical purposes, the right-hand end of the outer barrel 14 is substantially closed so that when the inner barrel 20 is abutting the plate 16, the flow of the gases is through the small orifice 17 only. In some cases, it may not even be necessary to provide the orifice 17. As the gases pass through the ports or openings 23 they enter the interior of the housing 10 and there is a pressure drop due to the restriction caused by the openings 23, which pressure drop in the gas serves to reduce pulsations or surges in the gas flow. As the conditions which have been enumerated above which affect the flow of the gas and cause pulsations are altered, the relative position of the inner barrel 20 with respect to the outer barrel 14 can be altered to change the number of ports 23 which are exposed or uncovered. Such control or movement of the inner barrel 20 is affected by the rotation of the operating rod 29 which co-acts with the threaded nut 28 on the end plate 21. The rotation can be effected manually by the handle or wheel 30 or by any conventional device which will control rotation of the rod 29 electrically, pneumatically or hydraulically. The operation of the rod 29 may also be made automatic by the use of a conventional pulsation detecting device such as an oscilloscope (not shown) which would function in response to pulsations in the gas outlet stream from the dampener.

After the gas has passed into the interior of the housing 10 it moves toward the outlet 12 of the housing 10. In many cases after the gas is emitted from the ports 23 into the interior of the housing 10, the flow is still rough and contains surges and pulsations due to resonance properties of the gas in the housing. These resonance properties can be controlled to prevent resonance of the gas as it flows through the housing by controlling the volume of the housing 10 with the resonance plate 40. The resonance plate 40 provides a chamber to the left thereof within the housing 10 so that if pulsations or surges of the gas flow occur due to acoustical or resonant properties of the gas, such pulsations or surges can be greatly reduced or eliminated by longitudinally moving the resonance plate 40 to adjust the volume of the housing 10. As has been explained above, the resonance plate 40 is moved longitudinally or axially within the housing 10 by a rotation of the handle or wheel 49 which effects a rotation of the operating rod 46, the resonance plate 40 being held against rotation by the longitudinal guide ribs 42 so that the rotation of the operating rod 46 effects the longitudinal movement of the plate 40. The rod 46 can be controlled manually, electrically, pneumatically, hydraulically, or automatically by conventional apparatus in the same manner as the rod 29.

It can be seen from the foregoing description that a pulsation dampener has been provided wherein means are provided for controlling the pressure drop within the dampener for changing conditions in the gas flow and also for controlling the resonance properties of the dampener for changing conditions in the gas flow, whereby pulsations or surges in the gas flow are eliminated. It should be pointed out that the flow of gas through the housing may be reversed from that described above so that opening 12 would serve as the inlet and opening 11 would serve as the outlet.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. A pulsation dampener adapted to be disposed in a line carrying gas, comprising a housing having an inlet and an outlet, a variable pressure drop means within said housing, for inducing a pressure drop in the gas flowing through said housing from said inlet to said outlet means establishing gas communication between said inlet and the pressure drop means whereby gas entering said inlet passes through said pressure drop means into said housing, said pressure drop means including a pair of telescoping tubular members adapted to be moved relative to each other, and control means connected to one of said members for moving said one of said members relative to the other member to change the amount of the induced pressure drop of the gas as it passes through said pressure drop means to reduce pulsations or surges of the gas during its flow.

2. A pulsation dampener adapted to reduce pulsations or surges in a flowing gas in a line comprising, a housing having an inlet and an outlet, pressure drop means within the housing for effecting a pressure drop in a gas as it flows into the housing through the inlet and passes from the housing through the outlet, and said pressure drop means including an outer tubular member secured in the housing, and inner tubular members slidably positioned within said outer tubular member, and control means connected to said inner tubular member for moving said inner tubular member relative to said outer tubular member to change the amount of the induced pressure drop in the gas flowing through the housing to thereby control the pressure drop effected by said pressure drop means whereby the pressure drop in the flowing gas may be controlled in accordance with varying conditions causing pulsations or surges in the flowing gas so as to remove same during the gas flow through the housing.

3. A pulsation dampener for reducing pulsations or surges in a gas flowing in a line comprising, a housing having an inlet and an outlet, a pressure drop means within the housing including an outer barrel, an inner barrel disposed within the outer barrel and slidable relative thereto, means for establishing gas communication from the inlet into the interior of the inner barrel, said outer barrel having a substantially closed end and ports in the wall of the barrel adjacent the closed end thereof, and means for moving the inner barrel relative to the outer barrel to uncover one or more of said ports for a flow of gas from the interior of the inner barrel through the ports into the housing.

4. The structure set forth in claim 3, wherein said ports are disposed in a plurality of substantially parallel rows with the ports being longitudinally staggered so that only one port is opened or closed at a time during the longitudinal movement of the inner barrel relative to the outer barrel, whereby accurate control of the amount of pressure drop in the flowing gas from the interior of the inner barrel into the housing is obtained.

5. The structure set forth in claim 3, wherein the means for moving the inner barrel relative to the outer barrel includes a threaded operating rod which extends through a threaded nut connected to the inner barrel so that upon rotation of the operating rod the nut is caused to travel and thereby the travel is imparted to the inner barrel to effect the longitudinal movement thereof.

6. In a pulsation dampener for reducing pulsations or surges in a gas flowing under compression, an outer barrel having an inlet opening intermediate its length and radial ports adjacent one end thereof, an inner barrel disposed within the outer barrel and movable axially relative to the outer barrel, said inner barrel being closed except for an open end in proximity to the end of the outer barrel having the radial ports and an opening communicating with the inlet opening in the intermediate portion of the outer barrel whereby gas may enter through the opening at the intermediate portion of the outer barrel and pass into the interior of the inner barrel for discharge through the open end of the inner barrel and then through the ports in the outer barrel which are uncovered by the inner barrel, and means for effecting axial movement of the inner barrel relative to the outer barrel to control the number of ports which are uncovered by the inner barrel to thereby control the amount of pressure drop in the gas as it flows from the inner barrel through the ports.

7. An improved pulsation dampener for reducing pulsations in a flowing gas, comprising a housing having an inlet and an outlet, means within the housing for effecting a pressure drop in the gas as it flows therethrough, and means for controlling the volume of the housing to prevent resonance of a gas flowing through the housing, whereby pulsations in the flowing gas are reduced as the gas flows through the housing.

8. An improved pulsation dampener for reducing pulsation in a flowing gas, comprising a housing having an inlet and an outlet, means within the housing for effecting a pressure drop in the gas as it flows therethrough, and means for controlling the volume of the housing to prevent resonance of a gas flowing through the housing, whereby pulsations in the flowing gas are reduced as the gas flows through the housing, said means for controlling the volume of the housing including a substantially circular resonance plate, and means for moving said plate axially within the housing.

9. In a pulsation dampener, means for controlling the volume of the dampener including, a housing having an outlet opening at its intermediate portion, an inlet opening near one end thereof and a resonance plate disposed in the housing on the opposite side of the outlet opening from said inlet opening, whereby the volume of the housing may be changed by relative movement of the plate with respect to the housing as a gas flows into the inlet through the housing and out through the outlet opening.

References Cited in the file of this patent
UNITED STATES PATENTS

| | | |
|---|---|---|
| 1,707,912 | Heindorf | Apr. 2, 1929 |
| 2,497,020 | Singer | Feb. 7, 1950 |
| 2,530,190 | Carver | Nov. 14, 1950 |